(12) United States Patent
Ma

(10) Patent No.: US 6,311,649 B1
(45) Date of Patent: Nov. 6, 2001

(54) INTERNAL COMBUSTION GASOLINE ENGINE

(75) Inventor: Thomas Tsoi Hei Ma, Essex (GB)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/529,072

(22) PCT Filed: Oct. 9, 1997

(86) PCT No.: PCT/GB98/03060

§ 371 Date: Apr. 6, 2000

§ 102(e) Date: Apr. 6, 2000

(87) PCT Pub. No.: WO99/19618

PCT Pub. Date: Apr. 22, 1999

(30) Foreign Application Priority Data

Sep. 10, 1997 (GB) .................................................... 9721296

(51) Int. Cl.⁷ ...................................................... F02B 43/08

(52) U.S. Cl. .................................................................. 123/3

(58) Field of Search ...................................... 123/575, 576, 123/3

(56) References Cited

FOREIGN PATENT DOCUMENTS

2328715-A * 3/1999 (GB) .

* cited by examiner

Primary Examiner—Tony M. Argenbright
Assistant Examiner—Hyder Ali
(74) Attorney, Agent, or Firm—Carlos L. Hanze

(57) ABSTRACT

An internal combustion engine includes a fuel storage tank, a fuel pump for drawing liquid fuel from the storage tank, a distillation unit for producing from the fuel drawn from the storage tank a plurality of flow streams of different volatility, and an engine management system for separately metering fuel to the engine from the flow streams. The engine management system is responsive to the rates at which the flow streams are produced by the distillation unit.

7 Claims, 1 Drawing Sheet

INTERNAL COMBUSTION GASOLINE ENGINE

FIELD OF THE INVENTION

The present invention relates to an internal combustion gasoline engine having a fuel fractioning system supplied with a blend of volatile liquid fuel from a fuel storage tank.

DESCRIPTION OF THE PRIOR ART

U.S. Pat. No. 5,373,825 discloses a fuel vapour extraction system intended for an engine burning a heavy oil that comprises a volatising chamber separate from the fuel tank for volatising the lighter fraction of the oil. Within the volatising chamber, the oil is heated by a heating element and the lighter fraction of the oil is driven out by the applied heat and entrained by ambient air drawn through the volatising chamber which transports the vapour to the intake system of the engine. The remaining liquid fraction that is not vaporised is mostly returned to the fuel tank, though a small proportion may be cooled and delivered to the engine as part of the metered fuel to be burnt in the engine.

A serious problem of the above vapour extraction system is that no attempt has been made to ensure that the vapour and liquid fuel fractions be burnt in the engine in the same proportion as that in which they are present in the original composition of the fuel. As a result, after prolonged use, the liquid fuel remaining in the fuel tank is depleted of its vapour fraction. In fact, it was proposed that the old fuel in the tank should be discarded from time to time and fresh fuel added to replenish the supply of fuel vapour. This suggestion is not acceptable in a motor vehicle.

GB-A-2,209,796 shows an engine having a fuel tank and a distillation unit for producing from fuel drawn from the fuel tank two fuel flow streams of different volatility. The engine also has a management system for separately metering fuel to the engine from the two streams and adjusts the rates of the flow streams so that the flow streams are consumed in the engine continuously.

It has been proposed by the present Applicant in British Patent Application No. 9716156.6 to provide a fuel vapour extraction system for a gasoline engine capable of continuously separating the fuel into a lighter vapour fraction and a heavier liquid fraction. In the latter proposal, the operating pressure in the volatising chamber is variable such that the vapour production rate always matches the vapour demand flow rate from the engine. The remaining liquid fraction that has been depleted of vapour is also metered to the engine and burnt, so that both the vapour and liquid fuel fractions are consumed together in the same proportion as the original composition of the fuel in the fuel tank. No fuel is returned to the fuel tank and there is no uncontrolled accumulation of any one of the fractions even after prolonged use. Such a system has advantage in that it is self-regulating based on achieving equilibrium between the rate of vapour production in the volatising chamber and the rate of vapour demand from the engine, the system being demand-driven, i.e., the engine sets the demand of the vapour fuel flow and the volatising chamber responds by adjusting its supply of fuel vapour to match the demand. A disadvantage however is the slow response time of the system and, under extreme conditions, the demand from the engine may exceed the supply capacity of the volatising chamber.

SUMMARY OF THE INVENTION

With a view of mitigating at least some of the above disadvantages, there is provided in the present invention an automotive internal combustion gasoline engine comprising a fuel storage tank, means for drawing liquid fuel from the storage tank, and a distillation unit for producing from the fuel drawn from the storage tank at least two fuel flow streams of different volatility, wherein the engine further comprises an engine management system for separately metering fuel to the engine from the different flow streams, the management system being responsive to the rates at which the different flow streams are produced by the distillation unit and serving to adjust the relative usage rates of the flow streams in dependence upon the rates at which they are produced by the distillation unit in such a manner that, at least during steady state operating conditions, the flow streams are all consumed in the engine continuously in substantially the same proportion as they are produced by the distillation unit, wherein the distillation unit comprises a continuous flow boiler for heating a flow of gasoline fuel and evaporating a flow of the low and medium boiling point vapour fuel fractions to leave behind a flow of the high boiling point liquid fuel fraction, a compressor for compressing to a high pressure the flow of the low and medium boiling point vapour fuel fractions, a condenser for receiving the compressed flow of fuel vapour from the compressor and condensing a flow of the medium boiling point liquid fuel fraction to leave behind a flow of the low boiling point vapour fuel fraction, and a high pressure fuel storage reservoir for accumulating at the bottom of the reservoir the flow of the medium boiling point liquid fuel fraction and in the ullage space of the reservoir the flow of the low boiling point vapour fuel fraction, and the engine management system comprises sensing means for measuring the accumulated quantity of the low boiling point vapour fuel fraction in the ullage space of the reservoir, sensing means for measuring the accumulated quantity of the medium boiling point liquid fuel fraction at the bottom of the reservoir, and regulating means for adjusting the relative usage rates in the engine of the low, medium and high boiling point fuel fraction flow streams drawn separately from the respective sections of the distillation unit in such a manner as to keep substantially constant the equilibrium quantities of the respective accumulated vapour and liquid fuels stored in the reservoir.

Unlike the vapour extraction system described in copending British Patent Application No. 9716156.6, the present invention is supply-driven, i.e., the distillation unit sets the supply of different proportions of the fuel fraction flow streams and the engine management system responds by adjusting the relative usage rates of these fuel streams metered separately to the engine to match the supply proportions. As a result, the invention can cope with variations in the composition of the original gasoline fuel and variations in the operating temperatures in various sections of the distillation unit by adjusting the relative usage rates of the separate fuel streams and metering each stream adaptively so as to maintain equilibrium condition for all the streams within the distillation unit.

It should be clear that the actual amounts of the vapour and liquid fuel fractions stored under equilibrium in the reservoir are not significant in the invention as long as they are kept constant by ensuring that the out-flows balance the in-flows within the reservoir. Moreover it is advantageous to provide relatively large amounts of the vapour and liquid fractions stored in the reservoir to act a buffers for coping with temporary changes in demand from the engine. For example, during transient operation of the engine, the buffer storage may permit the equilibrium to be temporarily shifted in either direction to cope with the dynamic fuel response changes thereby maintaining smooth operation. During cold start and warm up operations, the stored fuels may be used to meet all the engine fuel requirement while the engine and the distillation unit are still cold, and may be replenished gradually after the engine and the distillation unit have reached their normal operating temperatures.

In a preferred embodiment of the invention, the fractioning of the gasoline fuel may be determined according to the so-called E100 and E40 points along the fuel distillation curve, E100 being the percentage by volume of fuel vaporised up to 100° C. and E40 being the percentage by volume of fuel vaporised up to 40° C. By selecting the boiler temperature at 100° C. which can be conveniently provided using hot coolant thermostatically controlled from the engine, and by selecting the condenser temperature at 40° C. which can be conveniently provided using cool air circulating within the engine compartment of the vehicle, the relative proportions of the low, medium and high boiling point fuel fractions generated within the distillation unit will be in the order of 5%, 60% and 35% respectively for a typical commercially available gasoline fuel. The engine management system will adaptively adjust the relative usage rates of the three fuel fractions by metering each stream separately to the engine in the same proportions accordingly.

Preferably, a pressure sensor and a temperature sensor are used to measure the equilibrium quantity of the accumulated low boiling point vapour fuel stored under pressure in the reservoir and a liquid level sensor is used to measure the equilibrium quantity of the accumulated medium boiling point liquid fuel stored in the reservoir. In operation, for example, if the equilibrium liquid level in the reservoir is rising, the engine management system will increase the metering rate of the medium boiling point fuel stream to the engine and at the same time decrease the metering rate of the high boiling point fuel stream while iteratively adjusting the metering rate of the low boiling point fuel stream to maintain a constant equilibrium gas pressure in the reservoir such that the liquid level in the reservoir will gradually fall. Similarly, if the equilibrium gas pressure in the reservoir is rising, the engine management system will increase the metering rate of the low boiling point fuel stream to the engine and at the same time decrease the metering rate of the high boiling point fuel stream while iteratively adjusting the metering rate of the medium boiling point fuel stream to maintain a constant equilibrium liquid level in the reservoir such that the gas pressure in the reservoir will gradually fall. Thus by keeping both the equilibrium liquid level and the equilibrium gas pressure in the reservoir constant, the relative usage rates of the three fuel streams will match exactly the relative production rates of the respective fuel streams for a given original fuel and a given set of operating temperatures within the distillation unit, and the system will be capable of supplying fuel to the engine in the three streams continuously without excessive accumulation of any one stream for any prolonged period of time. The risk of small amount of air entrained in the fuel accumulating in the distillation unit is also prevented by simply disposing the trapped air along with the low boiling point vapour fuel fraction.

The three fuel streams of different boiling point range have distinctly different physical and chemical properties related to the volatility and the octane rating of each fuel fraction respectively. Good volatility is important for smooth operation, reliable cold start, clean combustion during warm up, good drivability as well as good transient behaviour, but excessive volatility may cause vapour lock in the fuel metering system. Good octane rating is important for efficient full load operation, quiet knock-free running and protection from engine damage, but controlled autoignition at part load can be advantageous for lean burn and ultra low $NO_x$ combustion. The present invention therefore offers significant opportunities of exploiting the fuel properties strategically in a variety of ways under different engine operating conditions by separately controlling the amount and the distribution of each fuel fraction delivered into the combustion chamber, thereby achieving better fuel economy, lower exhaust emissions, higher engine output, smoother running, easier starting and longer durability.

BRIEF DESCRIPTION OF THE DRAWING

The invention will now be described further, by way of example, with reference to the accompanying drawing which is a schematic diagram of an engine complete with its fuelling and management systems.

DETAILED DESCRIPTION OF THE PREFERRED EMBODIMENT

Figure 1:
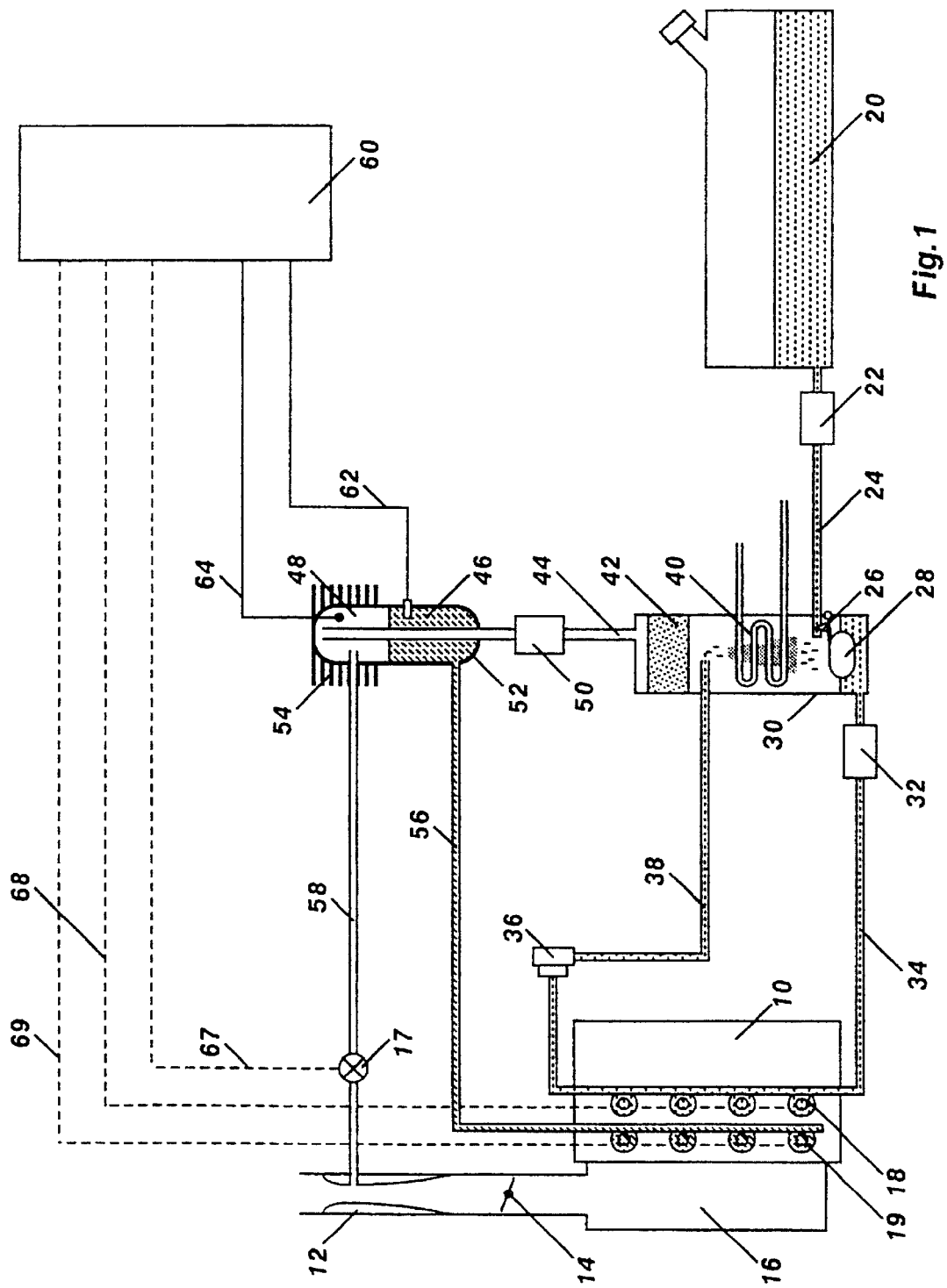

The single drawing shows an engine 10 having an intake manifold 16 that draws air from the ambient atmosphere by way of a venturi 12 and a main butterfly throttle 14. The fuelling system comprising a main storage tank 20 from which fuel is drawn by a pump 22 and supplied to a boiler 30 by way of a pipe 24.

The boiler 30 forms part of a closed circulation loop. At the bottom of the boiler 30 there is a float 28 and a needle valve 26 which maintains a constant level of fuel in the boiler 30, only drawing from the fuel tank 20 enough fuel to meet the demand of the engine. The fuel is drawn by a pump 32 from the bottom of the boiler 30 and supplied to a pressurised fuel rail 34, the pressure within which is maintained constant by a pressure relief valve 36. Excess fuel drawn from the fuel rail by the pressure relief valve 36 is returned to the boiler 30 and is dripped over a heat exchanger unit 40 that is heated by the engine coolant to a temperature of approximately 100° C. The fuel circulates rapidly around the loop as only a small proportion of the fuel delivered by the fuel pump 32 is required to meet the engine demand and, as a result, substantially the entire fraction of the fuel having a boiling point below 100° C. would be evaporated during the recirculation leaving only the higher boiling point liquid in the fuel rail 34. Thus the fuel injected by the fuel injectors 18 from the fuel rail 34 has low volatility and is composed mainly of the aromatic compounds of the fuel.

The vapour from the boiler 30 passes through a vapour storage canister 42 and a pipe 44 to a compressor 50 operating at typically 10 bar as compared with the 3 bar pressure in the fuel rail 34. The compressed vapour is fed into a pressurised storage reservoir 52 that has cooling fins 54 to cool the vapour to approximately 40° C. The cooled vapour condenses to a liquid 46 in the bottom of the storage reservoir 52 and is supplied at high pressure to a second fuel rail 56 that is connected to a second set of fuel injectors 19. When the fuel injectors 19 are opened, they supply to the engine cylinders a fuel blend having boiling points of between 40° C. and 100° C. at the pressure of 10 bar and is composed mainly of the heavier paraffins and olefins of the fuel.

The vapour fraction that does not condense remains as vapour in the ullage space 48 of the storage reservoir 52 and is supplied at high pressure to the venturi 12 by way of a pipe 58 and a gas injector 17. When the gas injector 17 is open, it supplies to the engine cylinders the most volatile fraction of the fuel containing mainly the lighter paraffins.

The level of liquid 46 in the storage reservoir 52 is sensed by means of a level sensor 62 and the output of the sensor is sent to an engine management system 60 which also receives over a line 64 the output of a pressure and temperature sensor located in the ullage space 48. Output lines 67, 68 and 69 from the engine management system 60 control the gas injector 17 and the fuel injectors 18 and 19, respectively.

Whereas prior art systems that distilled the fuel into different boiling point fractions attempted to produce those fractions in the ratio that they were consumed by the engine, in the present invention, the engine consumption of the different fractions of the fuel is set by the engine management system 60 to consume the different fractions in the same proportions as they are produced by the distillation unit.

The fuel injected by means of the injectors 18 contains only the high boiling point fraction. The remainder of the fuel will find its way into the pressurised storage reservoir 52. If the engine is consuming less of the lower boiling fraction than is being produced by the boiler 30, then the level of the liquid 46 will rise and the pressure of the vapour 48 will also rise. Conversely if the engine is consuming more of the lower boiling fraction than is being produced by the boiler 30, then the level of the liquid 46 will drop and the pressure of the vapour 48 will also drop. If the engine management system 60 trims the relative proportion of the fuel admitted by way of the injectors 18 and 19 and the gas injector 17 in such a manner as to maintain the fuel level in the reservoir 52 constant and the pressure and temperature in the ullage space of the reservoir 52 constant, then it will automatically deliver an overall fuel composition matching that of the fuel drawn from the fuel tank 20. The engine management system 60 therefore controls the fuel injectors 18 to meet the engine demand under steady state conditions and controls the fuel and gas injectors 19 and 17 to maintain the fuel level and the pressure in the reservoir 52 constant.

The relative proportions of the different fractions of the fuel will be constant for a given fuel and a given set of operating conditions in the distillation unit. The relative proportions of the fuel fractions need not be regulated by a closed feedback loop at all times as described above, but instead they may be set by open loop to ratios stored within the engine management system 60 and updated from time to time by a slower feedback loop tending to maintain the desired fuel level and pressure in the storage reservoir 52. These ratios can be stored in a keep-alive-memory and adopted while the engine is operating under other steady state conditions.

Because of the large volume of the storage reservoir 52 it is possible for the engine management system 60 to deviate intentionally from the equilibrium ratios for short periods of time to allow the engine to perform better during non-steady state conditions such as during cold starts or accelerations and decelerations. During such transient conditions the closed loop fine-trimming of the stored ratios can be disabled so that the ratios remain in the keep-alive-memory to be adopted immediately the engine returns to steady state operation. The management system will also be able to estimate the amount of fuel and vapour depleted from or added to the storage reservoir 52 during the transient period and to take the necessary steps to return the level to its desired value without disturbing the ratios stored in the keep-alive-memory.

During cold starts, the boiler 30 will be cold and therefore no low boiling point fuel and vapour will be produced. The fuel reaching the engine cylinders from the fuel injectors 18 will have the same composition as the fuel in the fuel tank and the engine will behave in the same manner as a conventional engine. However, it is desirable to add a lower boiling fraction to the fuel to assist in engine starting and this can be achieved in the described preferred embodiment of the invention because some fuel vapour can be drawn from the ullage space of the reservoir 52 and this can be further supplemented by fuel vapour drawn from that stored in the canister 42. Once the engine has started and warmed up, these two vapour buffer stores can be slowly replenished under the control of the engine management system 60.

Even if the engine is operated at all times with a homogeneous charge, the above described fuelling system provides advantages during transient and non-steady state operations by allowing the overall fuel blend to be temporarily modified during these periods. The real benefit of the invention however is achieved in a stratified charge engine where the different fractions can be directed to different parts of the combustion chamber to take advantage of their different combustion properties. The charge stratification can thus be designed to improve the robustness of combustion and reduce noxious exhaust emissions during idle and part load operation and to suppress the tendency to knock under full load operation.

What is claimed is:
1. An internal combustion engine comprising:
   a fuel storage tank;
   a fuel pump for drawing liquid fuel from the storage tank;
   a distillation unit for producing from the fuel drawn from the storage tank a plurality of flow streams of different volatility, said distillation unit comprising:
      a continuous flow boiler for heating a flow of fuel and evaporating a flow of low and medium boiling point vapour fuel fractions leaving a first one of said flow streams, the first flow stream being a flow of high boiling point liquid fuel fraction;
      a compressor for compressing the flow of the low and medium boiling point vapour fuel fractions;
      a condenser for receiving the compressed flow of the low and medium boiling point vapour fuel fractions from said compressor and for condensing a second one of said flow streams, the second flow stream being a flow of medium boiling point liquid fuel fraction, leaving behind a third one of said flow streams, the third flow stream being a flow of low boiling point vapour fuel fraction; and
      a high pressure fuel storage reservoir for accumulating at the bottom of the reservoir the flow of the medium boiling point liquid fuel fraction, said reservoir comprising an ullage space for storing the flow of the low boiling point vapour fuel fraction; and
   an engine management system for separately metering fuel to the engine from the flow streams, the management system being responsive to the rates at which the flow streams are produced by said distillation unit and serving to adjust the relative usage rates of the flow streams based at least upon the rates at which the flow streams are produced by said distillation unit such that, at least during steady state operating conditions of the engine, the flow streams are all consumed in the engine continuously in substantially the same proportion as they are produced by the distillation unit.
2. The engine according to claim 1, wherein the engine management system comprises:
   a first sensor for measuring an accumulated quantity of the low boiling point vapour fuel fraction in said ullage space of said reservoir;

a second sensor for measuring an accumulated quantity of the medium boiling point liquid fuel fraction at the bottom of the reservoir; and regulating means for adjusting the relative usage rates in the engine of the low, medium and high boiling point fuel fraction flow streams drawn separately from the respective sections of the distillation unit in such a manner as to keep substantially constant equilibrium quantities of the respective accumulated vapor and liquid fuels stored in said reservoir.

3. The engine according to claim 2, wherein: comprising:

said first sensor is a pressure and temperature sensor; and said second sensor is a liquid level sensor.

4. The engine according to claim 1, wherein said engine management system further comprises:

a keep-alive-memory for storing ratios of the fuel fractions corresponding to said flow streams produced by said distillation unit; and a closed control loop for trimming the stored ratios in response to a sensed accumulation or depletion of the low and medium boiling point fuel fractions in said storage reservoir.

5. The engine according to claim 1, further comprising a vapour storage canister for storing the low boiling point fuel vapour fraction for use during engine cold starts.

6. A method of operating an internal combustion engine using a plurality of fuel flow streams each having different volatility, the method comprising:

heating a flow of liquid fuel;

evaporating a flow of low and medium boiling point vapour fuel fractions from the liquid fuel leaving a first one of said flow streams, the first flow stream being a flow of high boiling point liquid fuel fraction;

compressing the flow of the low and medium boiling point vapour fuel fractions;

condensing a second one of said flow streams from the compressed flow of the low and medium boiling point vapour fuel fractions, the second flow stream being a flow of medium boiling point liquid fuel fraction, leaving behind a third one of said flow streams, the third flow stream being a flow of low boiling point vapour fuel fraction; and separately metering fuel to the engine from the flow streams, said metering step comprising the step of adjusting the relative usage rates of the flow streams based at least upon the rates at which the flow streams are produced such that, at least during steady state operating conditions of the engine, the flow streams are all consumed in the engine continuously in substantially the same proportion as they are produced.

7. The method according to claim 6, wherein said metering step comprises:

measuring an accumulated quantity of the low boiling point vapour fuel fraction;

measuring an accumulated quantity of the medium boiling point liquid fuel fraction; and adjusting the relative usage rates in the engine of the low, medium and high boiling point fuel fraction flow streams drawn in such a manner as to keep substantially constant equilibrium quantities of the respective accumulated vapour and liquid fuels.

* * * * *